US012595187B2

(12) United States Patent (10) Patent No.: US 12,595,187 B2
Sato et al. (45) Date of Patent: Apr. 7, 2026

(54) BARIUM COMPOUND STRUCTURE AND MANUFACTURING METHOD THEREFOR

(71) Applicant: Panasonic Intellectual Property Management Co., Ltd., Osaka (JP)

(72) Inventors: Natsuki Sato, Osaka (JP); Ryosuke Sawa, Osaka (JP); Naoki Kurizoe, Osaka (JP); Tatsuro Yoshioka, Osaka (JP); Tohru Sekino, Osaka (JP); Tomoyo Goto, Osaka (JP); Sunghun Cho, Osaka (JP); Yeongjun Seo, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 667 days.

(21) Appl. No.: 17/926,615

(22) PCT Filed: May 17, 2021

(86) PCT No.: PCT/JP2021/018579
§ 371 (c)(1),
(2) Date: Nov. 20, 2022

(87) PCT Pub. No.: WO2021/241300
PCT Pub. Date: Dec. 2, 2021

(65) Prior Publication Data
US 2023/0183089 A1 Jun. 15, 2023

(30) Foreign Application Priority Data
May 27, 2020 (JP) ................................. 2020-092471

(51) Int. Cl.
*C01G 25/00* (2006.01)
*C01G 23/00* (2006.01)

(52) U.S. Cl.
CPC ............. *C01G 25/00* (2013.01); *C01G 23/00* (2013.01)

(58) Field of Classification Search
None
See application file for complete search history.

(56) References Cited

U.S. PATENT DOCUMENTS

2009/0142578 A1 6/2009 Riman et al.
2020/0384527 A1* 12/2020 Böhnke ............... C04B 40/0263

FOREIGN PATENT DOCUMENTS

CN 105130423 A 12/2015
JP H06321539 A * 11/1994
(Continued)

OTHER PUBLICATIONS

Shih et al., Silica coating on barium titanate particles, Materials Letters, 1995 (Shih) (Year: 1995).*
(Continued)

*Primary Examiner* — Keling Zhang
(74) *Attorney, Agent, or Firm* — Renner, Otto, Boisselle & Sklar, LLP

(57) ABSTRACT

Provided is a barium compound structure including: a plurality of first compound particles containing a barium compound that is crystalline and is different from barium sulfate; a binding part covering a surface of each of the plurality of first compound particles and containing barium sulfate that is crystalline; and a plurality of second compound particles containing a compound that contains silicon. The first compound particles are bound through at least one of the binding part or the plurality of second compound particles.

9 Claims, 7 Drawing Sheets

(56)                    References Cited

FOREIGN PATENT DOCUMENTS

| JP | 2005306634 A | * | 11/2005 |
| JP | 2011-520739 A | | 7/2011 |
| JP | 2013-082600 A | | 5/2013 |
| JP | 2013-142103 A | | 7/2013 |

OTHER PUBLICATIONS

Machine translation of Joon et al., JP 2013082600A (Year: 2013).*
Machine translation of Mitsutoshi et al., JP H06321539A (Year: 1994).*
Machine translation of Koji, JP 2005306634A (Year: 2005).*
International Search Report for corresponding Application No. PCT/JP2021/018579, mailed Jun. 22, 2021.
Written Opinion for corresponding Application No. PCT/JP2021/018579, mailed Jun. 22, 2021.

* cited by examiner

EXAMPLE 1

COMPARATIVE EXAMPLE 1

BARIUM ZIRCONATE—ICSD

BARIUM SULFATE—ICSD

DIFFRACTION ANGLE $2\theta$ (°)

BARIUM COMPOUND STRUCTURE AND MANUFACTURING METHOD THEREFOR

TECHNICAL FIELD

The present invention relates to a barium compound structure and a method for manufacturing the barium compound structure.

BACKGROUND ART

Barium compounds are widely used as materials for electronic components. For example, barium compounds, such as barium titanate ($BaTiO_3$) and barium zirconate ($BaZrO_3$), are known as ferroelectrics and are used as materials for electronic components, such as capacitors. These barium compounds are used as ceramics in electronic components.

As a method for manufacturing ceramics, Patent Literature 1 discloses a method for manufacturing ceramics from a porous matrix. The method includes a step of bringing a porous matrix containing a first reactant into contact with an infiltration medium carrying a second reactant. The method also includes a step of infiltrating the infiltration medium into at least part of the interstitial space of the porous matrix under conditions with which the reaction between the first and second reactants is promoted, and producing a first product free of barium titanate. The method also includes a step of allowing the first product to occur and fill at least part of the interstitial space of the porous matrix, and thus manufacturing ceramics.

CITATION LIST

Patent Literature

Patent Literature 1: Japanese Translation of PCT International Application Publication No. 2011-520739

SUMMARY OF THE INVENTION

In the method disclosed in Patent literature 1, an infiltration medium is brought into contact with a porous matrix to promote the reaction between the first and second reactants. The porous matrix can be molded by pressurizing a powder of a metal oxide, for example. However, the porous matrix contains many pores, which may become fragile parts. Thus, a molded body made through such a method may not have enough mechanical strength.

The present invention has been made in consideration of the above issue, which is inherent in the related art. An object of the present invention is to provide a barium compound structure having high mechanical strength and a method for manufacturing the barium compound structure.

In response to the above issue, a barium compound structure according to a first aspect of the present invention includes a plurality of first compound particles, a binding part, and a plurality of second compound particles. The plurality of first compound particles contains a barium compound that is crystalline and is different from barium sulfate. The binding part covers a surface of each of the plurality of first compound particles and contains barium sulfate that is crystalline. The plurality of second compound particles contains a compound that contains silicon. The first compound particles are bound to each other through at least one of the binding part or the plurality of second compound particles.

A method for manufacturing a barium compound structure according to a second aspect of the present invention includes a step of obtaining a mixture through mixing a first compound powder containing a barium compound that is crystalline and is different from barium sulfate, a second compound powder containing a compound containing silicon, and an aqueous solution containing sulfate ions. The method includes a step of pressurizing and heating the mixture under conditions of a pressure of 10 to 600 MPa and a temperature of 50 to 300° C.

DESCRIPTION OF EMBODIMENTS

Figure 1:
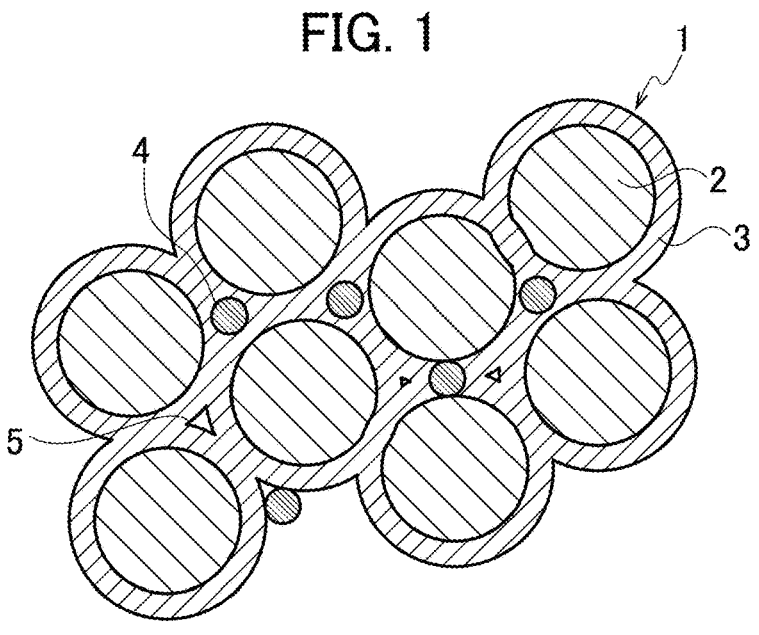
FIG. 1 is a schematic cross-sectional view of an example of a barium compound structure according to the present embodiment.

Referring to the drawings, a detailed description is given below of a barium compound structure and a method for manufacturing the barium compound structure. Note that dimensional ratios in the drawings are exaggerated for convenience of explanation and are sometimes different from actual ratios.

[Barium Compound Structure]

As illustrated in FIG. 1, a barium compound structure 1 according to the present embodiment includes multiple first compound particles 2, a binding part 3, and multiple second compound particles 4. In the barium compound structure 1, multiple pores 5 are present among the first compound particles 2 and are surrounded by the binding part 3.

The multiple first compound particles 2 are bound through at least one of the binding part 3 or the multiple second compound particles 4. That is, the multiple first compound particles 2 may be bound through the binding part 3, through the second compound particles 4, or through the binding part 3 and the second compound particles 4. The multiple first compound particles 2 are bound through these to form the barium compound structure 1, which is an aggregate of the multiple first compound particles 2. Note that the barium compound structure 1 may have a part in which some of the first compound particles 2 are directly bound to each other without the binding part 3 or the second compound particles 4 being interposed therebetween.

The binding part 3 covers the surface of each of the multiple first compound particles 2. The binding part 3 may cover part or the entirety of the surface of each of the first compound particles 2. By covering the surface of each of the first compound particles 2 with the binding part 3 in such a way that each surface is not exposed, it is possible to prevent direct exposure of each of the first compound particles 2 to the external environment. Thus, it is possible to improve the chemical stability of the barium compound structure 1 even under special circumstances, such as acidic conditions. Thus, it is preferable that the surface of each of the first compound particles 2 be not exposed to the outer surface.

Each of the second compound particles 4 is arranged between the first compound particles 2, for example. Each of the second compound particles 4 is arranged inside the binding part 3, for example. When the barium compound structure 1 contains the multiple second compound particles 4, the second compound particles 4 are closely filled in between each of the first compound particles 2, which enables the structure of the barium compound structure 1 to be made dense. It is thus possible to improve the mechanical strength of the barium compound structure 1. The surface of each of the multiple second compound particles 4 may be covered with the binding part 3. Part of the surface or the entirety of the surface of each of the multiple second compound particles 4 may be covered with the binding part 3.

The barium compound structure 1 may include the multiple first compound particles 2, the binding part 3, and the multiple second compound particles 4 as a main component. In the present embodiment, the main component means that the total amount of the multiple first compound particles 2, the binding part 3, and the multiple second compound particles 4 to the barium compound structure 1 is 50 vol % or more, for example. The total amount of the multiple first compound particles 2, the binding part 3, and the second compound particles 4 to the barium compound structure 1 may be 80 vol % or more, or 90 vol % or more.

The multiple first compound particles 2 contain a barium compound that is different from barium sulfate. The barium compound may be a complex metal oxide, for example. Examples of the complex metal oxide include barium aluminate, barium molybdate, barium niobate, barium chromate, barium titanate, barium tungstate, barium zirconate, and barium stannate. These may be used individually or in combination. The barium compound that is different from barium sulfate may be at least one of barium titanate or barium zirconate. These barium compounds are ferroelectric and can be used as materials for electronic components, such as capacitors.

The barium compound that is different from barium sulfate is crystalline. When the barium compound is crystalline, it is possible to improve the dielectric constant of the barium compound structure 1.

The shape of each of the first compound particles 2 is not limited but can be spherical, for example. Each of the first compound particles 2 may have a whisker shape (needle shape) or a scale shape. Particles having a whisker shape or a scale shape have a higher degree of contact with other particles compared to particles having a spherical shape, and thus it is possible to increase the strength of the entire barium compound structure 1.

The average particle size of the multiple first compound particles 2 is not limited. The average particle size of the multiple first compound particles 2 is preferably 50 nm to 100 μm, more preferably 100 nm to 50 μm, particularly preferably 300 nm to 20 μm. When the average particle size of the first compound particles 2 is within these ranges, the rigidity of the barium compound structure 1 is maintained and the percentage of the pores 5 present inside the barium compound structure 1 is reduced, which makes it possible to improve the mechanical strength of the barium compound structure 1. In this description, the "average particle size" is, unless otherwise mentioned, a value calculated as an average of the particle sizes observed in several to several tens of visual fields using observation means such as a scanning electron microscope (SEM) or a transmission electron microscope (TEM).

The binding part 3 contains barium sulfate that is crystalline. Barium sulfate that is crystalline has high chemical stability. For example, barium titanate and barium zirconate have acid-soluble properties, and thus covering the surface of each of the multiple first compound particles 2 with the binding part 3 enables the first compound particles 2 to be effectively protected from the external environment. It is thus possible to improve the chemical stability of the barium compound structure 1. Since each of the first compound particles 2 and the binding parts 3 contain a barium element, interdiffusion tends to occur between the multiple first compound particles 2 and the binding parts 3, and thus it is possible to improve the mechanical strength of the barium compound structure 1.

The binding part 3 may contain an element contained in the multiple second compound particles 4. That is, the binding part 3 may contain at least one or more elements selected from the group consisting of silicon, aluminum, and titanium, which is described below. When the binding part 3 and the multiple second compound particles 4 have the same element, interdiffusion tends to occur between them, and thus it is possible to improve the mechanical strength of the barium compound structure 1.

The multiple second compound particles 4 contain a compound containing silicon. Such second compound particles 4 are bound with at least one of the first compound particles 2 or the binding part 3, which makes it possible to enhance the mechanical strength of the barium compound structure 1. The multiple second compound particles 4 may contain an oxide containing silicon. That is, the compound containing silicon may be silicon oxide. Although silicon oxide is described, not only silicon oxide but also aluminum oxide and titanium oxide have similar reactivity. Thus, the multiple second compound particles 4 may contain a compound containing at least one or more elements selected from the group consisting of silicon, aluminum, and titanium.

The compound contained in the multiple second compound particles 4 is preferably amorphous. The second compound particles 4 containing an amorphous compound have high reactivity and thus the binding with the binding part 3 becomes strong, which makes it possible to improve the mechanical strength of the barium compound structure 1. In this description, amorphous means that no diffraction peaks are observed in the compound contained in the multiple second compound particles 4 when an X-ray diffraction pattern of the barium compound structure 1 is measured.

As described above, the barium compound structure 1 preferably contains the multiple second compound particles 4 containing amorphous silicon oxide. However, the barium compound structure 1 may contain a Ba—Si—O based compound, and a metal-Si—O based compound or the like, the metal is contained in each of the first compound particles 2, such as Ti or Zr.

The shape of each of the second compound particles 4 is not limited, and the second compound particles 4 may have a spherical shape, a whisker shape (needle shape), or a scale shape, for example. The average particle size of the multiple second compound particles 4 is preferably 0.1 or more to 100 nm or less. Since the multiple second compound particles 4 having the average particle size as described above are closely packed to fill the space between each of the multiple first compound particles 2, it is possible to make the structure of the barium compound structure 1 dense and to improve the mechanical strength of the barium compound structure 1.

The volume ratio of the multiple first compound particles 2 to the multiple second compound particles 4 is preferably 1 or more. By setting the above-described volume ratio of the multiple first compound particles 2 to 1 or more, it is possible to increase the ratio of the multiple first compound particles 2, which serve as an aggregate in the barium compound structure 1, and thus it is possible to improve the mechanical strength of the barium compound structure 1. The above-described volume ratio of the first compound particles 2 is preferably 2 or more, more preferably 4 or more. The volume ratio of the multiple first compound particles 2 is not limited as long as the barium compound structure 1 has high mechanical strength, but may be 100 or less, for example.

The average particle size ratio of the multiple first compound particles 2 to the multiple second compound particles 4 is preferably 1 or more. By setting the average particle size ratio to 1 or more, the second compound particles 4 are closely filled between the multiple first compound particles 2, and thus it is possible to make the barium compound structure 1 dense. It is thus possible to further improve the mechanical strength of the barium compound structure 1. Note that the above-described average particle size ratio is more preferably 2 or more, even more preferably 5 or more. The above-described average particle size ratio is not limited as long as the barium compound structure 1 has high mechanical strength, but may be 100 or less, for example.

The volume ratio of the multiple first compound particles 2 to the binding part 3 is preferably 1 or more. By setting the above-described volume ratio of the multiple first compound particles 2 to 1 or more, it is possible to increase the ratio of the multiple first compound particles 2, which serve as an aggregate in the barium compound structure 1, and thus it is possible to improve the mechanical strength of the barium compound structure 1. The above-described volume ratio of the first compound particles 2 is preferably 2 or more, more preferably 4 or more. The volume ratio of the multiple first compound particles 2 is not limited as long as the barium compound structure 1 has high mechanical strength, but may be 100 or less, for example.

The percentage of the multiple first compound particles 2 to the total of the multiple first compound particles 2, the binding part 3, and the multiple second compound particles 4 is preferably 50 vol % or more. By setting the percentage of the multiple first compound particles 2 to 50 vol % or more, it is possible to improve the mechanical strength and dielectric constant of the barium compound structure 1. The above-described percentage of the multiple first compound particles 2 is more preferably 60 vol % or more.

In the barium compound structure 1, the molar ratio of barium to silicon is preferably 1 or more. By setting the molar ratio of barium to 1 or more, it is possible to promote the binding of each of the first compound particles 2 through the binding part 3, and thus it is possible to increase the mechanical strength of the barium compound structure 1.

The porosity of the barium compound structure 1 is preferably 30% or less. That is, when the cross section of the barium compound structure 1 is observed, the average value of the percentage of the pores 5 per unit area is preferably 30% or less. When the porosity is 30% or less, the barium compound structure 1 becomes dense and has increased strength. When the porosity is 30% or less, the occurrence of cracks starting from the pores 5 in the barium compound structure 1 is prevented, and thus it is possible to increase the bending strength of the barium compound structure 1. Note that the porosity is more preferably 20% or less, even more preferably 10% or less.

In this description, the porosity can be determined as follows. First, a cross section of the barium compound structure 1 is observed to discriminate between the pores 5 and parts other than the pores 5 such as the multiple first compound particles 2, the binding part 3, and the multiple second compound particles 4. Then, the unit area and the area of the pores 5 in that unit area are measured to obtain the percentage of the pores 5 per unit area, which is defined as the porosity. Note that it is more preferable to obtain the percentage of the pores 5 per unit area at multiple points in a cross section of the barium compound structure 1 and then to define the average value of the percentage of the pores 5 per unit as the porosity. When a cross section of the barium compound structure 1 is observed, an optical microscope, a scanning electron microscope (SEM), and a transmission electron microscope (TEM) are usable. The unit area and the area of the pores 5 in that unit area may be measured through binarizing an image observed using a microscope.

The size of the pore 5 present inside the barium compound structure 1 is not limited but is preferably as small as possible. When the size of pores is small, cracks starting from the pores 5 are prevented, which makes it possible to increase the strength of the barium compound structure 1 and to improve the machinability of the barium compound structure 1. Note that the size of pores in the barium compound structure 1 is preferably 5 μm or less, more preferably 1 μm or less, even more preferably 100 nm or less. The size of the pores 5 inside the barium compound structure 1 is determined by observing a cross section of the barium compound structure 1 using a microscope in the same manner as the porosity described above.

The shape of the barium compound structure 1 is not limited, and the barium compound structure 1 can have, for example, a plate shape, a film shape, a rectangular shape, a lumpy shape, a rod shape, or a spherical shape. When the barium compound structure 1 has a plate shape or a film shape, its thickness is not limited but can be 50 μm or more, for example. The barium compound structure 1 according to the present embodiment is formed by using a pressure heating method as described below. It is thus possible to easily obtain the barium compound structure 1 having a large thickness. Note that the thickness of the barium compound structure 1 may be 1 mm or more, or also 1 cm or more. The upper limit of the thickness for the barium compound structure 1 is not limited but can be 50 cm, for example.

The barium compound structure 1 preferably has a Vickers hardness of 1 GPa or more measured according to JIS R 1610:2003 (hardness testing method for fine ceramics). In this case, the barium compound structure 1 has excellent mechanical strength and thus can be easily used for building materials, for example.

As described above, the barium compound structure 1 according to the present embodiment includes the multiple first compound particles 2, the binding part 3, and the multiple second compound particles 4. The multiple first compound particles 2 contain a barium compound that is crystalline and is different from barium sulfate. The binding part 3 covers the surface of each of the multiple first compound particles 2 and contains barium sulfate that is crystalline. The multiple second compound particles 4 contain a compound containing silicon. The multiple first compound particles 2 are bound through at least one of the binding part 3 or the multiple second compound particles 4. The barium compound structure 1 contains the multiple second compound particles 4 and has a dense structure, and thus the percentage of the pores 5 is small. The multiple first compound particles 2 are bound through at least one of the binding part 3 or the multiple second compound particles 4. Thus, the barium compound structure 1 according to the present embodiment has high mechanical strength. In the barium compound structure 1, each of the first compound particles 2 is covered with the binding part 3 having water resistance, acid resistance, and alkali resistance, and thus the barium compound structure 1 has high chemical stability.

Since the barium compound structure 1 according to the present embodiment is obtained by being pressurized while being heated at a temperature of 50 to 300° C. as described below, which makes it possible to add a member having low heat resistance to the barium compound structure 1. Specifically, the barium compound structure 1 may contain organic matter or resin particles in addition to the multiple first compound particles 2, the binding part 3, and the multiple second compound particles 4. A member added to the barium compound structure 1 is not limited to one having low heat resistance, such as organic matter, and the barium compound structure 1 may include particles made from metal particles or an inorganic compound.

[Method for Manufacturing Barium Compound Structure]

Next, a method for manufacturing the barium compound structure 1 is described. It is possible to manufacture the barium compound structure 1 by performing a step of mixing a first compound powder, a second compound powder, and an aqueous solution containing sulfate ions to obtain a mixture and a step of pressurizing and heating the mixture.

Specifically, the mixture is prepared by first mixing the first compound powder, which is used as a raw material for the multiple first compound particles 2, the second compound powder, which is used as a raw material for the multiple second compound particles 4, and the aqueous solution containing sulfate ions. When a member having low heat resistance is added to the barium compound structure 1, the member having low heat resistance is added to the above-described mixture.

The first compound powder contains a barium compound that is crystalline and is different from barium sulfate. The barium compound may be a complex metal oxide, for example. Examples of the complex metal oxide include barium aluminate, barium molybdate, barium niobate, barium chromate, barium titanate, barium tungstate, barium zirconate, and barium stannate, as described above. These may be used individually or in combination. The barium compound that is different from barium sulfate may be at least one of barium titanate or barium zirconate.

The second compound powder contains a compound containing silicon. The second compound powder may contain an oxide containing silicon as described above. That is, the compound containing silicon may be silicon oxide. Although silicon oxide is described, not only silicon oxide but also aluminum oxide and titanium oxide have similar reactivity. Thus, the second compound powder may contain a compound containing at least one or more elements selected from the group consisting of silicon, aluminum, and titanium. The compound contained in the second compound powder may be amorphous.

It is possible to obtain an aqueous solution containing sulfate ions by mixing at least one of sulfuric acid or sulfate with a water-containing solvent. The sulfate is not limited as long as it is possible to dissolve the sulfate in a water-containing solvent to form sulfate ions, and examples of the sulfate include ammonium sulfate. The water-containing solvent is preferably pure water or ion-exchanged water. The water-containing solvent may contain an acid or alkaline substance in addition to water. It is enough for the water-containing solvent to contain water as the main component, and an organic solvent, such as alcohol, may be included. The water-containing solvent may contain ammonia.

The concentration of the aqueous solution containing sulfate ions is preferably an amount enough to form barium sulfate on the surface of each of the first compound particles 2. When an aqueous ammonium sulfate solution is used as the aqueous solution containing sulfate ions, the concentration of the aqueous ammonium sulfate solution is preferably between 20 and 60 mass %.

The amount of the first compound powder added to the total of the first compound powder and the second compound powder is not limited as long as it is possible to improve the mechanical strength of the barium compound structure 1. The amount of the first compound powder added is preferably 50 mass % or more, more preferably 60 mass % or more, even more preferably 70 mass % or more to the total of the first compound powder and the second compound powder. The above-described amount of the first compound powder added is preferably 99 mass % or less, more preferably 95 mass % or less.

The proportion of the aqueous solution containing sulfate ions to the above-described mixture is preferably an amount enough to form barium sulfate on the surface of each of the first compound particles 2. The above proportion is preferably 5 to 90 mass %, more preferably 20 to 80 mass %.

Figure 2:
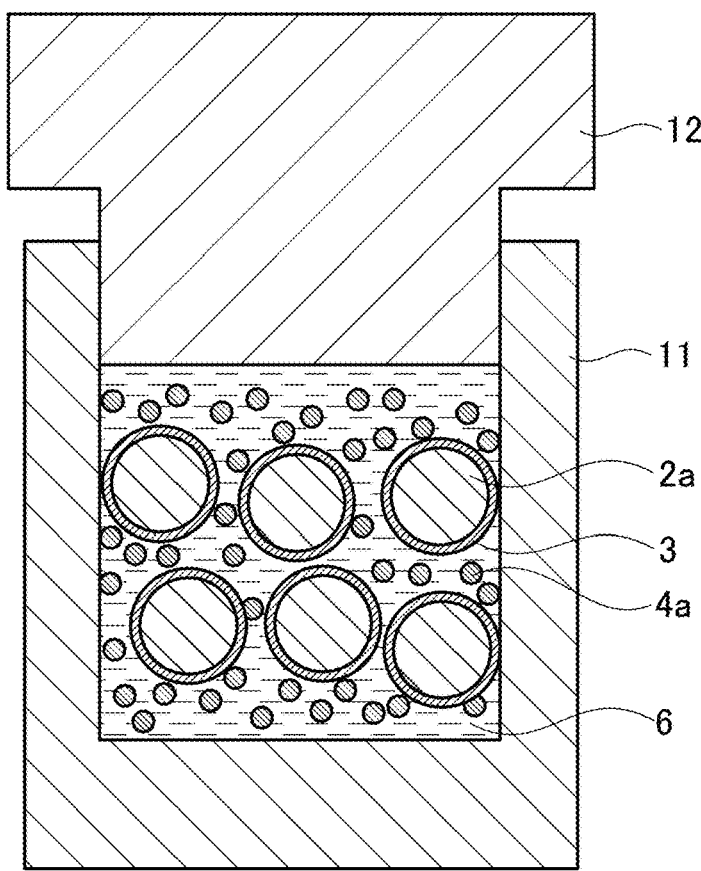
FIG. 2 is a schematic diagram illustrating an example of a method for manufacturing a barium compound structure.

The mixture of the first compound powder, the second compound powder, and the aqueous solution containing sulfate ions is filled in a die. As illustrated in FIG. 2, the die includes a lower die 11 having a concave part and an upper die 12 having a convex part, and pressing the mixture placed in the concave part with the convex part enables the mixture to be pressurized.

The mixture may be prepared by placing the mixed powder containing the first compound powder and the second compound powder in the concave part of the lower die 11 and then adding the aqueous solution containing sulfate ions to the mixed powder. A mixture prepared by mixing in advance the first compound powder, the second compound powder, and the aqueous solution containing sulfate ions may be placed in the concave part of the lower die 11. After placing the mixture in the die, the die is heated as necessary. The upper die 12 is then lowered toward the lower die 11, which is fixed, and the mixture is pressurized to bring the inside of the die into a high-pressure state. Here, barium ions are eluted from the barium compound onto each surface of particles 2a that make up the first compound powder. The barium ions react with sulfate ions in an aqueous solution 6 to form barium sulfate, resulting in the binding part 3. By pressurizing the mixture while heating, the filling proportion of the particles 2a making up the first compound powder and particles 4a making up the second compound powder becomes large. Thus, as described above, the multiple first compound particles 2 are bound through at least one of the binding part 3 or the multiple second compound particles 4. As a result, it is possible to obtain the barium compound structure 1 described above.

The heating and pressurizing conditions for the mixture obtained by mixing the first compound powder, the second compound powder, and the aqueous solution containing sulfate ions are not limited as long as it is possible to obtain the barium compound structure 1 described above. For example, it is preferable to pressurize the above-described mixture at a pressure of 10 to 600 MPa while heating at a temperature of 50 to 300° C. Note that the temperature for heating the above-described mixture is more preferably 80 to 250° C., even more preferably 100 to 200° C. The pressure for pressurizing the above-described mixture is more preferably 50 to 600 MPa, more preferably 200 to 600 MPa.

In the manufacturing method according to the present embodiment, the mixture obtained by mixing the first compound powder, the second compound powder, and the aqueous solution containing sulfate ions is heated and pressurized, and thus it is possible to obtain the barium compound structure 1 having excellent density and excellent strength. In the manufacturing method according to the present embodiment, the structure is obtained by being pressurized while heated at the temperature of 50 to 300° C., which makes it possible to eliminate precise temperature control and to reduce the manufacturing cost.

As described above, the method for manufacturing the barium compound structure 1 includes a step of obtaining a mixture by mixing a first compound powder containing a barium compound that is crystalline and is different from barium sulfate, a second compound powder containing a compound containing silicon, and an aqueous solution containing sulfate ions. The method for manufacturing the barium compound structure 1 includes a step of pressurizing and heating the mixture. The heating and pressurizing conditions for the mixture are preferably a pressure of 10 to 600 MPa and a temperature of 50 to 300° C. The manufacturing method according to the present embodiment makes it possible to obtain the barium compound structure 1 having high mechanical strength even when the heating temperature is low. Thus, it is also possible to add a member having low heat resistance to the barium compound structure 1.

[Member Provided with Barium Compound Structure]

Next, a member provided with the barium compound structure 1 is described. The barium compound structure 1 is usable as a member having excellent dielectricity. The above-described member is usable for electronic components, such as capacitors, piezoelectric elements, and memories. The above-described member is usable as a substrate for a thin film circuit, a substrate for a sensor member and a substrate for a semiconductor process, a ceramic member of a semiconductor manufacturing apparatus, and a housing of general electronic equipment.

As described above, the barium compound structure 1 is formable into a plate shape having a large thickness and has excellent chemical stability. The barium compound structure 1 has high mechanical strength, and thus can be cut in the same manner as a general ceramic member and can undergo a surface treatment. Thus, the barium compound structure 1 is also suitably used as a building material. The building material is not limited, and possible examples include an exterior wall material (siding) and a roof material. Road materials and outer groove materials are also possible examples of the building material.

10

EXAMPLES

The present embodiment is described below in more detail below with reference to examples, but the present embodiment is not limited to these examples.

Example 1

(Preparation of Test Samples)

First, an amount of 0.78 g of a barium zirconate powder (manufactured by Sigma-Aldrich Co. LLC) and an amount of 0.0777 g of a silica powder (manufactured by NIPPON AEROSIL CO., LTD.) were mixed with acetone using an agate mortar and an agate pestle to obtain a mixed powder. The obtained mixture was put in a cylindrical die ($\varphi$10 mm) having an internal space. Note that in this example, the barium zirconate powder corresponds to the first compound powder, and the silica powder corresponds to the second compound powder. The average particle size of the multiple particles making up the second compound powder is 12 nm.

Next, an amount of 7.4 g of an ammonium sulfate powder (manufactured by FUJIFILM Wako Pure Chemical Corporation) was dissolved in an amount of 15 ml of ion-exchanged water to obtain an aqueous ammonium sulfate solution. The above-described mixture was put in the molding die, an amount of 312 µl of the aqueous ammonium sulfate solution was added thereto, and these were mixed using a plastic spatula. In this example, the aqueous ammonium sulfate solution corresponds to the aqueous solution containing sulfate ions.

Then, the mixed powder containing the aqueous ammonium sulfate solution was heated and pressurized under conditions of 120° C., 400 MPa, and 20 minutes, and a cylindrical test sample was obtained.

Comparative Example 1

A cylindrical test sample was obtained following the same procedure as in the example 1 except that only an amount of 0.78 g of the barium zirconate powder described above was used instead of the mixed powder.

Evaluation of Test Samples (Crystal Structure Analysis)

Figure 3:
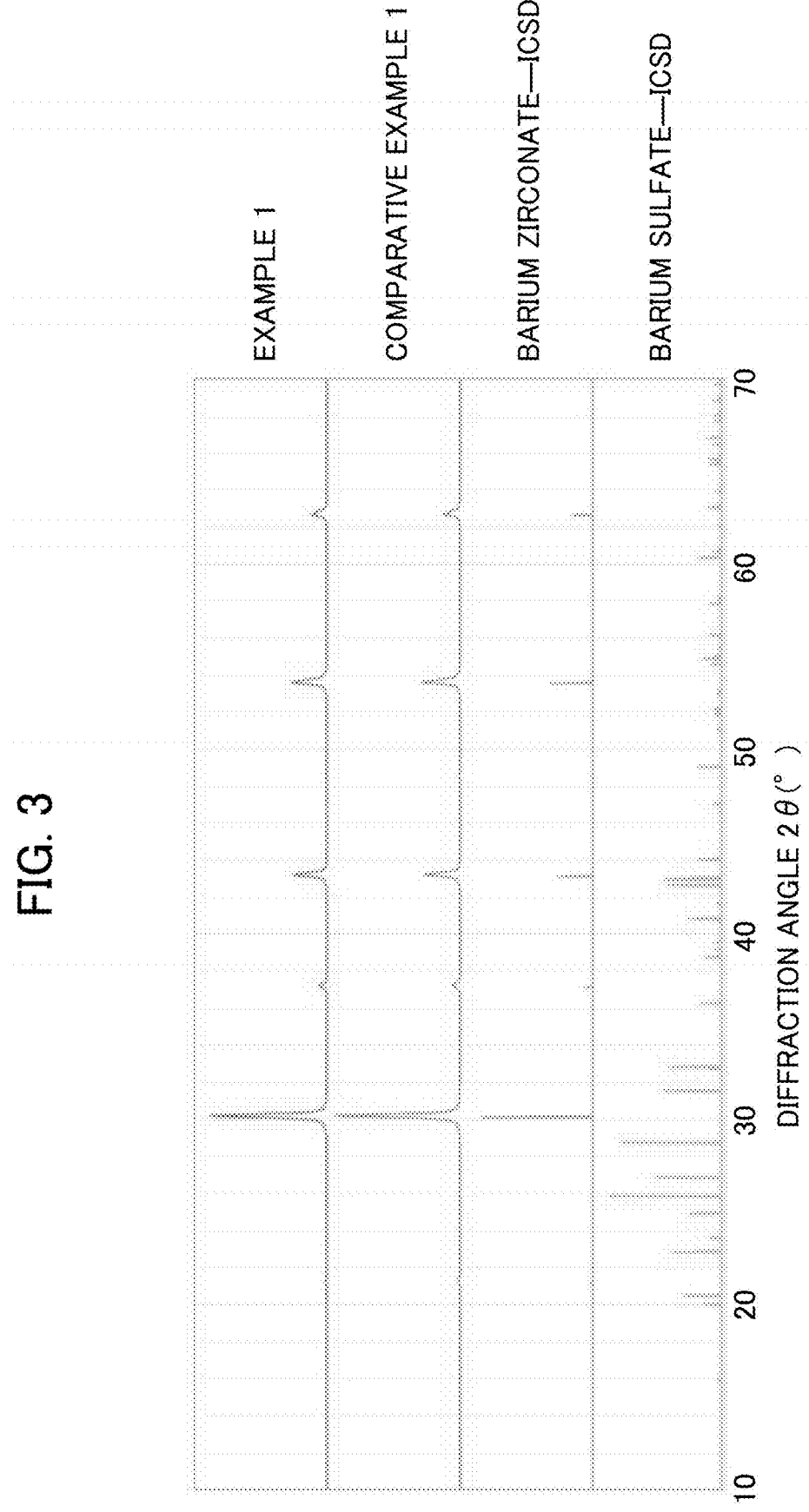
FIG. 3 is a graph illustrating XRD patterns of an example 1, a comparative example 1, and barium zirconate and barium sulfate registered in ICSD (inorganic crystal structure database).
Figure 4:
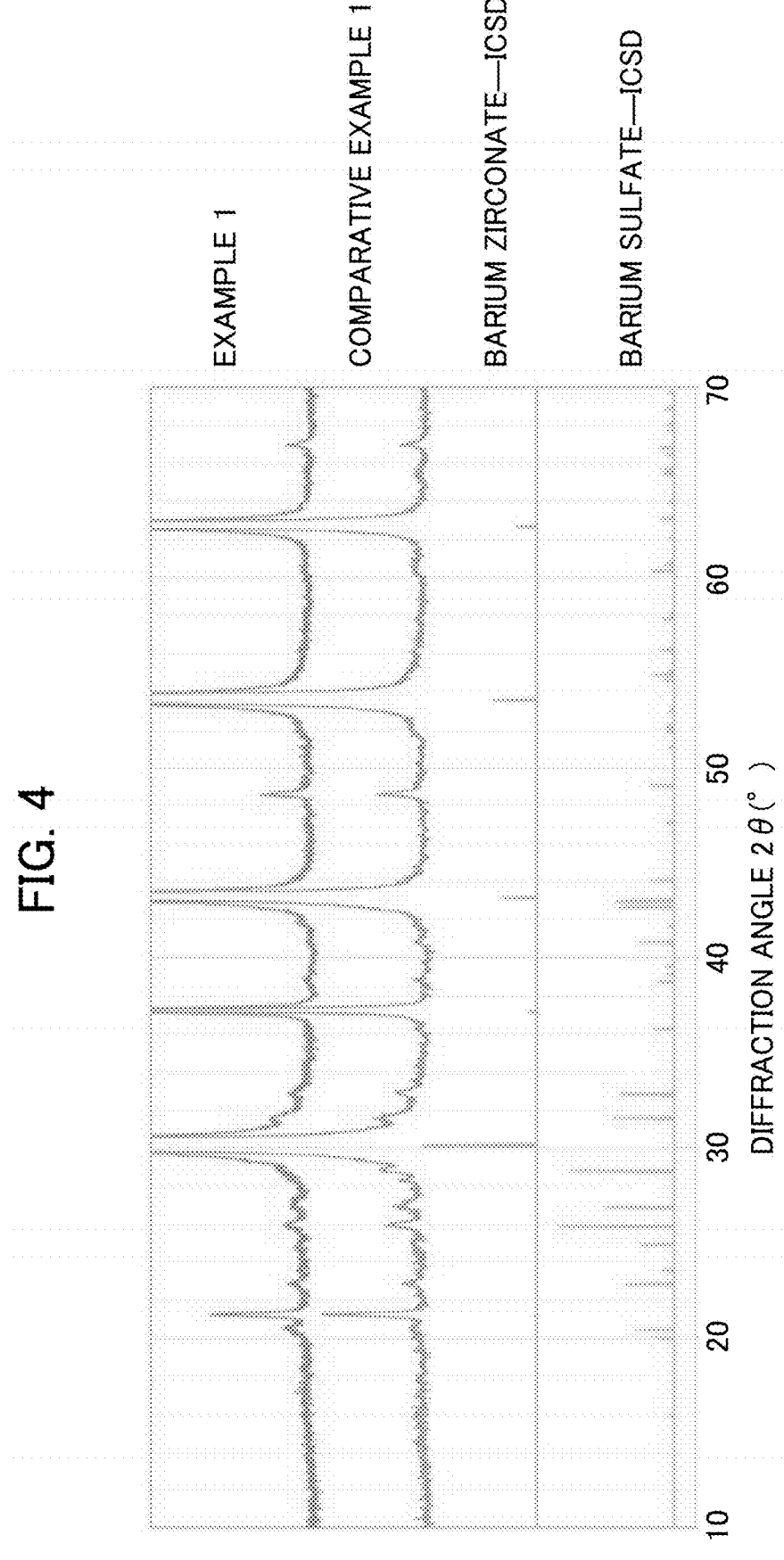
FIG. 4 is a graph illustrating enlarged XRD patterns of the example 1 and the comparative example 1 in FIG. 3.

A powder X-ray diffraction (XRD) instrument was used to measure XRD patterns of powders obtained by pulverizing the test samples of the example 1 and the comparative example 1. FIG. 3 is a graph illustrating XRD patterns of the example 1, the comparative example 1, and barium zirconate and barium sulfate registered in ICSD. FIG. 4 is a graph of enlarged XRD patterns of the example 1 and the comparative example 1 in FIG. 3.

From FIG. 3, it can be seen that the main phase is barium zirconate in both the test samples of the example 1 and the comparative example 1. From FIG. 4, it can be seen that both the test samples of the example 1 and the comparative example 1 contain barium sulfate. There was no significant difference in the XRD patterns between the example 1 and the comparative example 1, and thus the silicon-containing compound in the test sample of the example 1 is not crystalline and is considered to be amorphous.

(Structure Observation and Elemental Analysis)

Figure 5:
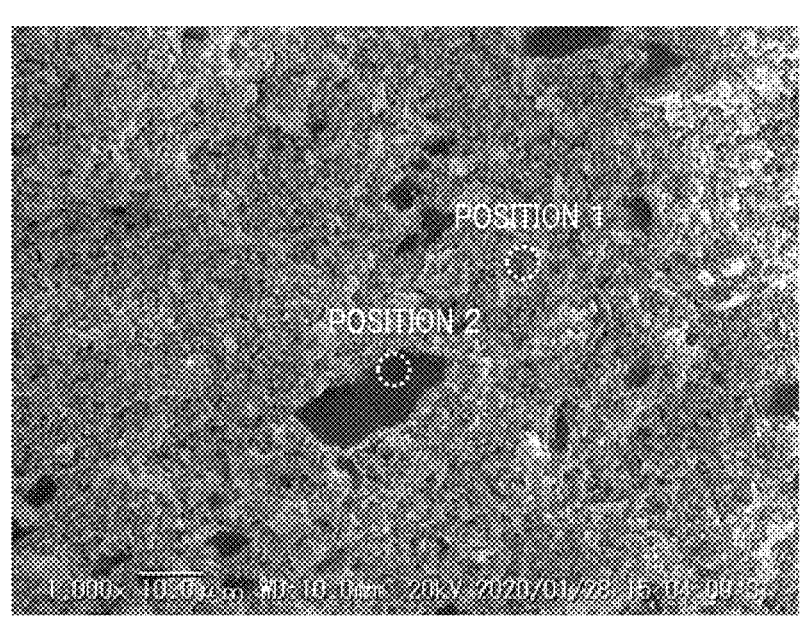
FIG. 5 is a scanning electron microscope (SEM) image of a test sample of the example 1 observed at a magnification of 1,000.
Figure 6:
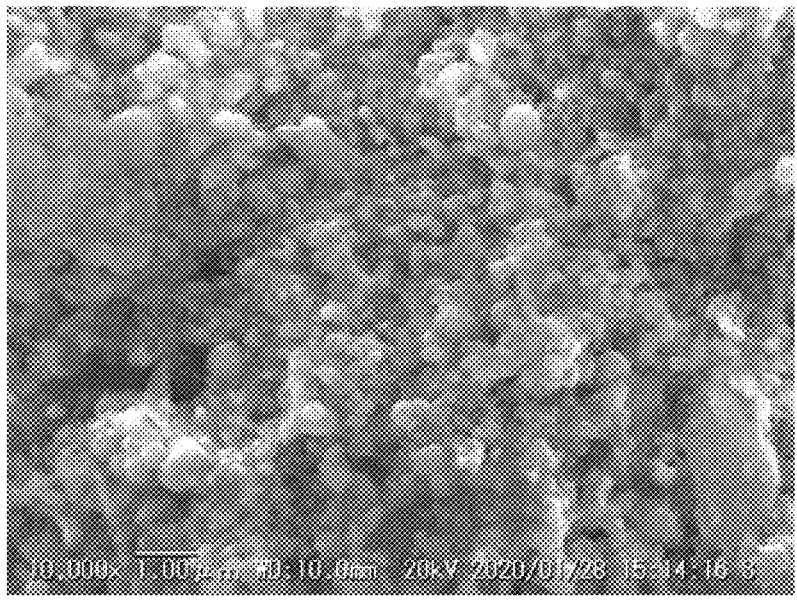
FIG. 6 is an SEM image of the test sample of the example 1 observed at a magnification of 10,000.
Figure 7:
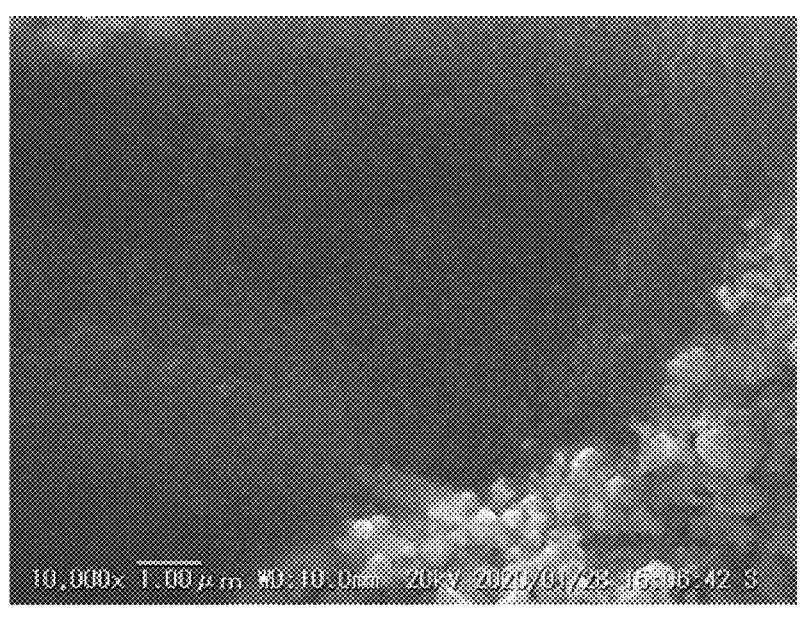
FIG. 7 is an SEM image of the test sample of the example 1 observed at a magnification of 10,000 at a different position from FIG. 6.
Figure 8:
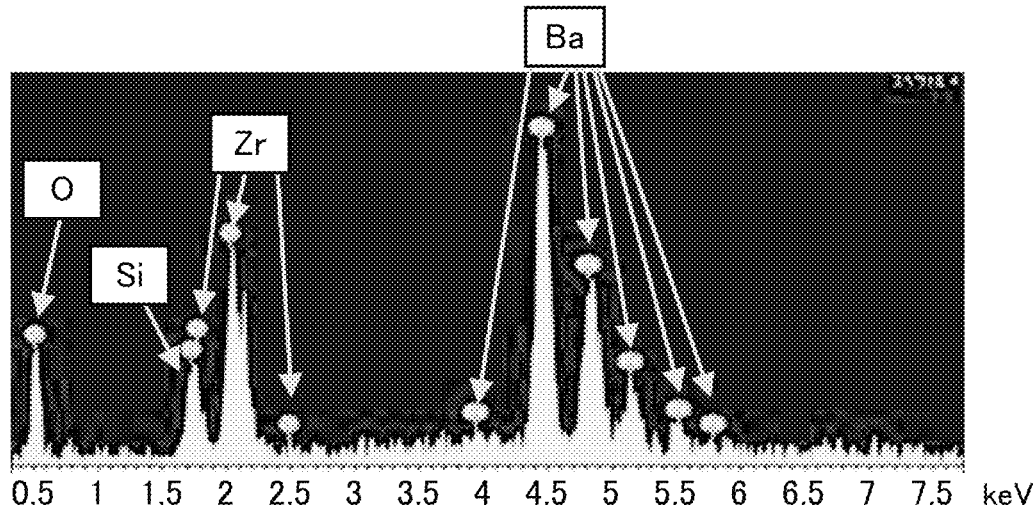
FIG. 8 is an EDX spectrum at position 1 in FIG. 5.
Figure 9:
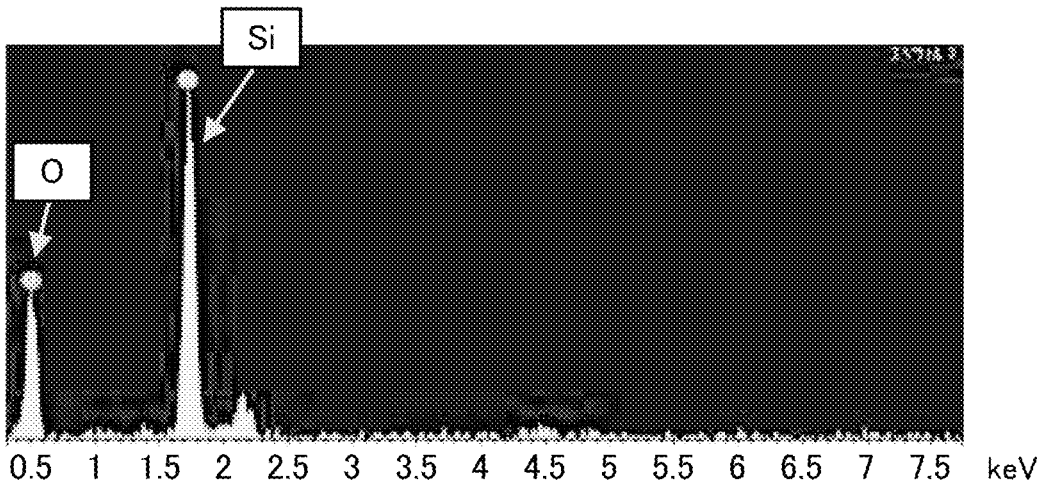
FIG. 9 is an EDX spectrum at position 1 in FIG. 5.
Figure 10:
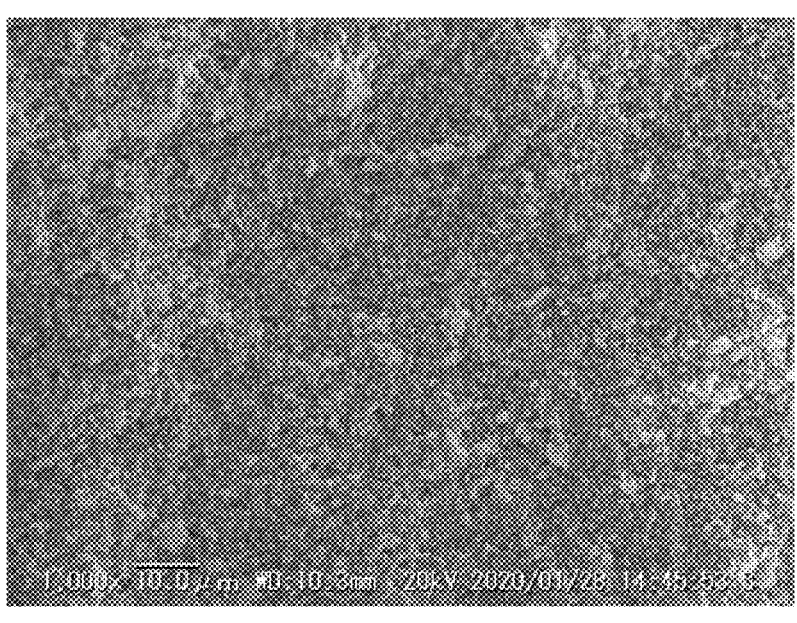
FIG. 10 is an SEM image of a test sample of the comparative example 1 observed at a magnification of 1,000.
Figure 11:
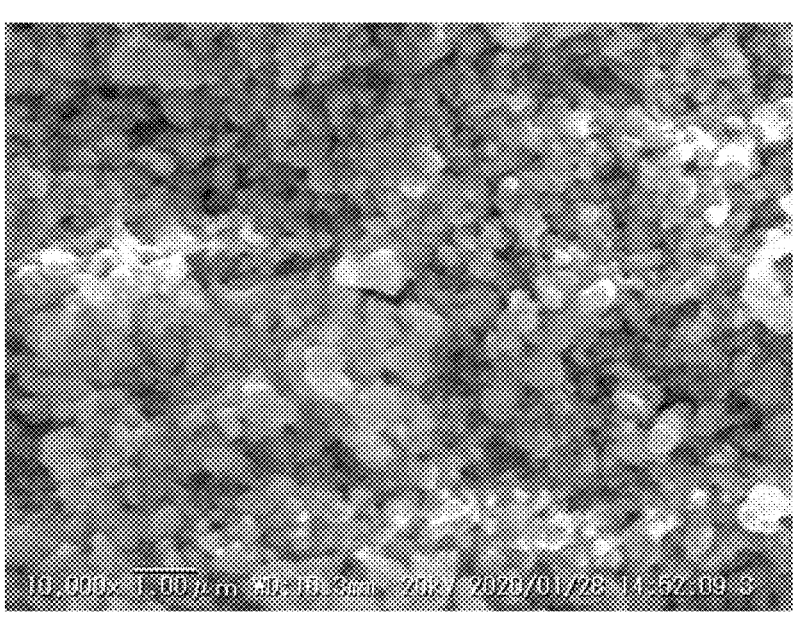
FIG. 11 is an SEM image of the test sample of the comparative example 1 observed at a magnification of 10,000.

Cross-sections of cut cylindrical test samples were observed using a scanning electron microscope (SEM). An elemental analysis using energy dispersive X-ray spectroscopy (EDX) was also performed at different positions on the test sample of the example 1. Note that the observation surface was sputtered with gold. FIG. 5 is an SEM image of the test sample of the example 1 observed at a magnification of 1,000. FIG. 6 is an SEM image of the test sample of the example 1 observed at a magnification of 10,000. FIG. 7 is an SEM image of the test sample of the example 1 observed at a magnification of 10,000 at a different position from FIG. 6. FIG. 8 is an EDX spectrum at position 1 in FIG. 5. FIG. 9 is an EDX spectrum at position 2 in FIG. 5. FIG. 10 is an SEM image of the test sample of the comparative example 1 observed at a magnification of 1,000. FIG. 11 is an SEM image of the test sample of the comparative example 1 observed at a magnification of 10,000.

From the SEM images in FIG. 10 and FIG. 11, it can be seen that the comparative example 1 has a structure in which many particles are linked. In contrast, from FIGS. 5 to 7, it was confirmed that the example 1 had a dense part that was observed as black (position 2) in addition to a part having the structure of many linked particles (position 1) as seen in the comparative example 1.

From the EDX spectra in FIG. 8, it can be seen that Ba, Zr, Si, and O are detected at position 1, in which a composition containing barium zirconate as well as Si and O is contained. From the EDX spectra in FIG. 9, it can be seen that Si and O are detected at position 2 and the part observed as black contains a composition containing Si and O. In the SEM image in FIG. 7, an aggregate of fine particles forms a dense area, which is observed as black, and thus the fine particles are considered to be derived from the raw material silica.

Note that it is considered that barium sulfate was contained at position 1, but the amount of S contained at position 1 was too small to be detected. Barium sulfate is formed through a reaction of barium zirconate particles with an aqueous ammonium sulfate solution, and thus barium sulfate is considered to bind respective barium zirconate particles to form a structure in which the barium zirconate particles are linked.

From the results of crystal structure analysis and elemental analysis, it can be seen that the test sample of the example 1 contains barium zirconate, barium sulfate, and the silicon-containing compound. It can also be seen that barium zirconate and barium sulfate are crystalline and the silicon-containing compound is amorphous.

(Vickers Hardness Measurement)

The Vickers hardness of the test sample of the example 1 and the comparative example 1 was measured according to JIS R1610. As a result of measurement, the Vickers hardness of the test sample of the example 1 was 1.4 GPa and that of the test sample of the comparative example 1 was 0.45 GPa, which indicates that the test sample of the example 1 had a higher hardness.

These results indicate that the addition of a silica powder as a raw material makes it possible to make the structure of the barium compound structure dense and to improve the mechanical strength of the barium compound structure.

The entire contents of Japanese Patent Application No. 2020-092471 (filed May 27, 2020) are incorporated herein by reference.

Although the present embodiment has been described above, the present embodiment is not limited to these descriptions, and various modifications are possible within the scope of the gist according to the present embodiment.

INDUSTRIAL APPLICABILITY

The present disclosure makes it possible to provide a barium compound structure having high mechanical strength and a method for manufacturing the barium compound structure.

REFERENCE SIGNS LIST

1 Barium compound structure
2 First compound particles
3 Binding part
4 Second compound particles

The invention claimed is:

1. A barium compound structure, comprising:
   a plurality of first compound particles containing a barium compound that is crystalline and is different from barium sulfate;
   a binding part covering a surface of each of the plurality of first compound particles and containing barium sulfate that is crystalline; and
   a plurality of second compound particles containing a compound that contains silicon, wherein
   the first compound particles are bound through at least one of the binding part or the plurality of second compound particles, and
   each of the plurality of second compound particles is arranged inside the binding part.

2. The barium compound structure according to claim 1, wherein
   the barium compound is at least one of barium titanate or barium zirconate.

3. The barium compound structure according to claim 1 wherein
   the compound contained in the plurality of second compound particles is amorphous.

4. The barium compound structure according to claim 1, wherein
   a volume ratio of the plurality of first compound particles to the binding part is greater than or equal to 1.

5. The barium compound structure according to claim 1, wherein
   a molar ratio of barium to the silicon is greater than or equal to 1.

6. The barium compound structure according to claim 1, wherein
   a porosity is 30% or less.

7. The barium compound structure according to claim 1, wherein
   the plurality of first compound particles has an average particle size of 50 nm to 100 μm.

8. The barium compound structure according to claim 1, wherein
   the plurality of first compound particles has an average particle size of 300 nm to 100 μm.

9. The barium compound structure according to claim 1, wherein
   the binding part contains silicon.

\* \* \* \* \*